US012810192B2

(12) United States Patent
Debnath et al.

(10) Patent No.: US 12,810,192 B2
(45) Date of Patent: Nov. 24, 2026

(54) SYSTEMS AND METHODS FOR MULTIPLEXING IMAGING IN TRAPPED ION QUANTUM COMPUTERS

(71) Applicant: IonQ, Inc., College Park, MD (US)

(72) Inventors: Shantanu Debnath, Lanham, MD (US); Tan Liu, Frederick, MD (US); Bo Zhao, Gainesville, FL (US)

(73) Assignee: IonQ, Inc., College Park, MD (US)

( * ) Notice: Subject to any disclaimer, the term of this patent is extended or adjusted under 35 U.S.C. 154(b) by 219 days.

(21) Appl. No.: 18/923,284

(22) Filed: Oct. 22, 2024

(65) Prior Publication Data

US 2025/0139484 A1 May 1, 2025

Related U.S. Application Data

(60) Provisional application No. 63/594,067, filed on Oct. 30, 2023.

(51) Int. Cl.
*G06N 10/40* (2022.01)
*G02B 7/182* (2021.01)

(52) U.S. Cl.
CPC ........... *G06N 10/40* (2022.01); *G02B 7/1827* (2013.01)

(58) Field of Classification Search
CPC ........ G06N 10/00; G06N 10/20; G06N 10/40; G06E 3/005; G02B 7/1827
See application file for complete search history.

(56) References Cited

U.S. PATENT DOCUMENTS

2023/0419151 A1* 12/2023 Spierings ............... G06N 10/80
2024/0395436 A1* 11/2024 Bernien ................... G21K 1/30

FOREIGN PATENT DOCUMENTS

CN 217586935 U * 10/2022
CN 219799241 U * 10/2023

* cited by examiner

*Primary Examiner* — David E Smith
(74) *Attorney, Agent, or Firm* — ARENTFOX SCHIFF LLP

(57) ABSTRACT

A system is provided for imaging trapped ions in a quantum computer. The system includes an ion trap that traps qubit ions and includes electrodes that shuttle individual qubit ions between a first position and a second position spatially different from the first position. The system includes a first imaging lens that collects fluorescence from a qubit ion that is trapped over a surface of the ion trap; a first sensor in a first optical path output from the first imaging lens; a first pick-off mirror in a second optical path output from the first imaging lens that is different than the first optical path; a second imaging lens that collects fluorescence that is reflected from the first pick-off mirror; and a second sensor in a third optical path. Moreover, a controller controls the electrodes to shuttle the qubit ion from the first position to the second position.

20 Claims, 5 Drawing Sheets

SYSTEMS AND METHODS FOR MULTIPLEXING IMAGING IN TRAPPED ION QUANTUM COMPUTERS

CROSS REFERENCE TO RELATED APPLICATIONS

This application claims priority to U.S. Patent Provisional Application No. 63/594,067, filed Oct. 30, 2023, the entire contents of which are hereby incorporated by reference.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In general, this disclosure describes various aspects of systems and methods for multiplexing imaging in trapped ion quantum computers and quantum computing systems.

In an exemplary aspect, a method is provided for imaging trapped ions in a quantum computer that includes shuttling, by a plurality of electrodes in an ion trap, at least one qubit ion of a plurality of qubit ions between at least a first position and a second position of spatially different positions in the ion trap; collecting, by a first imaging lens, fluorescence from the at least one qubit ion of the plurality of qubit ions trapped over a surface of the ion trap; configuring a first sensor in a first optical path output from the first imaging lens; controlling a first pick-off mirror disposed in a second optical path output from the first imaging lens that is different than the first optical path; collecting, by a second imaging lens, fluorescence that is reflected from the first pick-off mirror; configuring a second sensor in a third optical path output from the second imaging lens; and spatially filter the at least one qubit ion by controlling the electrodes in the ion trap to shuttle the at least one qubit ion from the first position in which the first imaging lens images the at least one qubit ion in the first optical path to the second position in which the first imaging lens images the at least one qubit ion in the second optical path.

In another exemplary aspect, the method includes controlling a second pick-off mirror in the third optical path between the second imaging lens and the second sensor.

In another exemplary aspect, the method includes adjusting the second pick-off mirror between a first position in which the second pick-off mirror reflects the fluorescence output from the second imaging lens to the second sensor to a second position that allows the fluorescence output from the second imaging lens in at least one additional optical path.

In another exemplary aspect, the method further includes configuring a third sensor in the third optical path to receive the reflected fluorescence that is output from the second imaging lens when the second pick-off mirror is in the second position.

In another exemplary aspect, a first imaging plane includes the first sensor and the second optical path and a second imaging plane includes the second and third sensors. In this aspect, the method can further include multiplexing an imaging of the at least one qubit ion between the first imaging plane and the second imaging plane by controlling the electrodes to shuttle the at least one qubit ion from the first position to the second position spatially different positions in the ion trap.

In another exemplary aspect, the method includes controlling the plurality of electrodes of the ion trap to shuttle an ion chain between the first position and the second position of spatially different positions in the ion trap. Moreover, the method can include spatially filtering the ion chain by controlling the plurality of electrodes to shuttle the ion chain from the first position in which the first imaging lens images the ion chain in the first optical path to the second position in which the first imaging lens images the ion chain in the second optical path.

In another exemplary aspect, each of the first and second sensors are at least one of a single mode fiber, a scientific CMOS camera, and a multimode fiber array configured to transport the imaged fluorescence to a photomultiplier tube.

In another exemplary aspect, a quantum information processing (QIP) system is provided for imaging trapped ions in a quantum computer. In this aspect, the system includes an ion trap configured to trap a plurality of qubit ions, the ion trap including a plurality of electrodes configured to shuttle individual qubit ions between at least a first position and a second position of spatially different positions in the ion trap; a first imaging lens configured to collect fluorescence from at least one qubit ion of the plurality of qubit ions trapped over a surface of the ion trap; a first sensor disposed in a first optical path output from the first imaging lens; a first pick-off mirror disposed in a second optical path output from the first imaging lens that is different than the first optical path; a second imaging lens configured to collect fluorescence that is reflected from the first pick-off mirror; a second sensor disposed in a third optical path output from the second imaging lens; and a controller configured to spatially filter the at least one qubit ion by controlling the electrodes in the ion trap to shuttle the at least one qubit ion from the first position in which the first imaging lens images the at least one qubit ion in the first optical path to the second position in which the first imaging lens images the at least one qubit ion in the second optical path.

Moreover, in an exemplary aspect, the system can include a second pick-off mirror disposed in the third optical path between the second imaging lens and the second sensor. In this aspect, the second pick-off mirror is motorized and configured to be adjusted between a first position in which the second pick-off mirror reflects the fluorescence output from the second imaging lens to the second sensor and a second position that allows the fluorescence output from the second imaging lens in at least one additional optical path.

Moreover, in an exemplary aspect, the system can include a third sensor disposed in the third optical path and configured to receive the reflected fluorescence that is output from the second imaging lens when the second pick-off mirror is in the second position. Moreover, the system can include a first imaging plane that includes the first sensor and the second optical path and a second imaging plane that includes the second and third sensors. In this aspect, the controller can be configured to multiplex an imaging of the at least one qubit ion between the first imaging plane and the second imaging plane by controlling the electrodes to shuttle the at least one qubit ion from the first position to the second position spatially different positions in the ion trap.

Moreover, in an exemplary aspect, the plurality of electrodes of the ion trap are configured to shuttle an ion chain between the first position and the second position of spatially different positions in the ion trap. In this aspect, the controller can be configured to spatially filter the ion chain by controlling the plurality of electrodes to shuttle the ion chain from the first position in which the first imaging lens images the ion chain in the first optical path to the second position in which the first imaging lens images the ion chain in the second optical path.

Moreover, in an exemplary aspect, each of the first and second sensors are at least one of a single mode fiber, a scientific CMOS camera, and a multimode fiber array configured to transport the imaged fluorescence to a photomultiplier tube.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
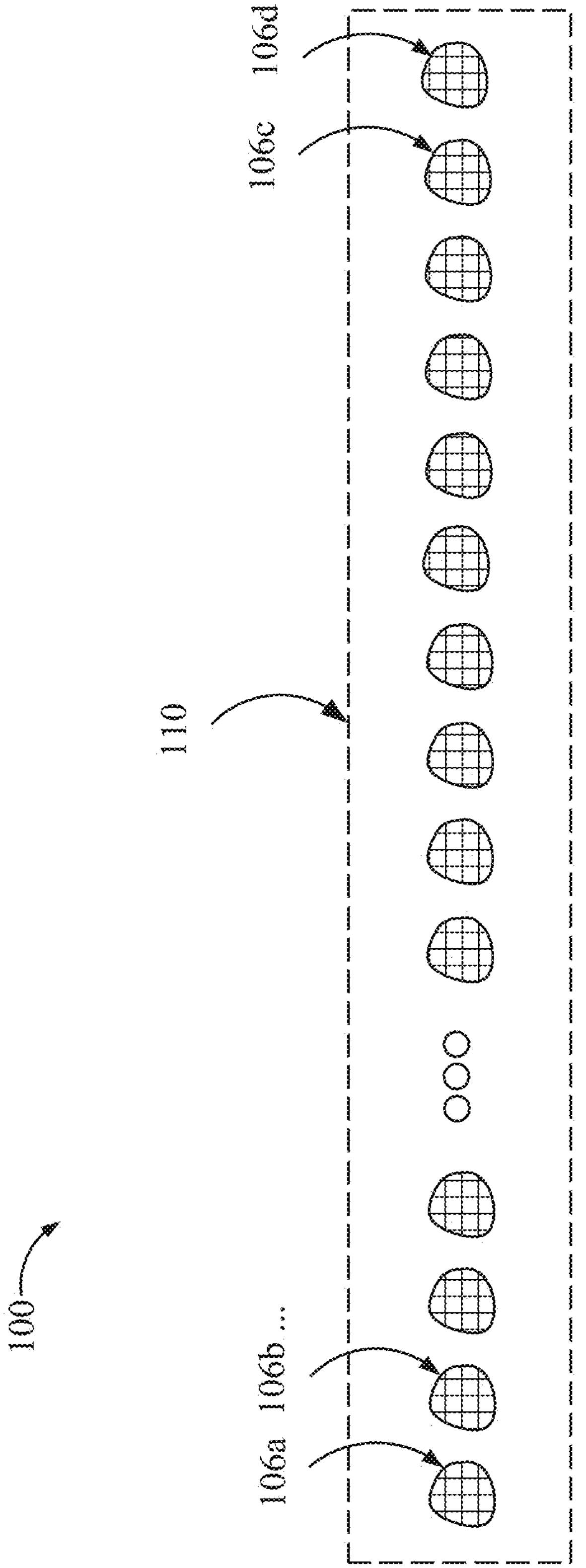
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

In general, quantum information processing (QIP) systems including imaging systems that are configured to detect light emitted by a single atom, for example a neutral atom or an ion. Moreover, QIP systems may include a linear chain of trapped ions. In either aspect, the QIP system may be configured to collect the quantum-based fluorescence of individual atoms with a high-resolution imaging system, which typically includes one or more optical relays and a camera sensor. In this regard, each of the trapped ions is a qubit that can be imaged onto camera sensors, such as individual optical fibers or a high efficiency camera, for qubit state detection.

According to these configurations, imaging systems in a trapped ion quantum computer often need to perform several processes to facilitate the quantum computing algorithms of different desired applications. These processes can include (i) loading of multi-qubit ion chains in the ion-trap; (ii) high precision imaging ion positions for stabilizing the ion trap (e.g., feedback loops to stabilize the trap; (iii) qubit state detection based on counting photons from state dependent fluorescence of qubits; (iv) aligning laser beams to the ion trap for qubit control and read out; and (v) collecting and detecting spontaneously emitted photons from individual ions into single mode optical fibers to generate ion-photon entanglement, which is essential for achieving remote quantum gates between distant trapped ion modules.

Depending on the operational requirements of the quantum computer, the imaging system is required to perform some or all of the aforementioned processes. However, performing these different processes can be challenging since the imaging sensors used for each process may, for example, be unique to the process and differ vastly (i.e., the type of sensor) from that used in some other process. That is, the processes invoke different sensors and can require switching between the sensors at different time scales. For example, for imaging ion positions and loading purposes, a scientific camera sensor can be used, whereas for photon-counting a photo-multiplier-tube would be preferred. Yet further, for ion-photon entanglement generation the system may be best configured by imaging a single qubit onto a single mode fiber core, which then delivers the collected photon to photo-multiplier-tubes for photon detection. For slower time scales, the system might use something that is relatively slow, such as an optical optomechanical device, such as a motorized mirror as described in detail below.

To facilitate these different processes, the imaging system of a QIP system should be configured to host and utilize a plurality of different types of imaging sensors. Moreover, it is preferable that such imaging systems have motorized opto-mechanics that are configured to switch between the desired processes depending on the application. The switching between the imaging processes can be slow or fast as compared to the speed with which motorized opto-mechanical parts of the imaging system can be moved. As described in detail below, a system and method is provided that provides for both fast multiplexing (e.g., spatial filtering) and slow multiplexing (e.g., controlling one or more motorized pick-off mirrors) of imaging processes in a single same optical system.

Solutions to the issues described above are explained in more detail in connection with FIGS. 1-5, with FIGS. 1-3 providing a general QIP system or quantum computer, and more specifically, of atomic-based QIP systems or quantum computers.

Figure 2:
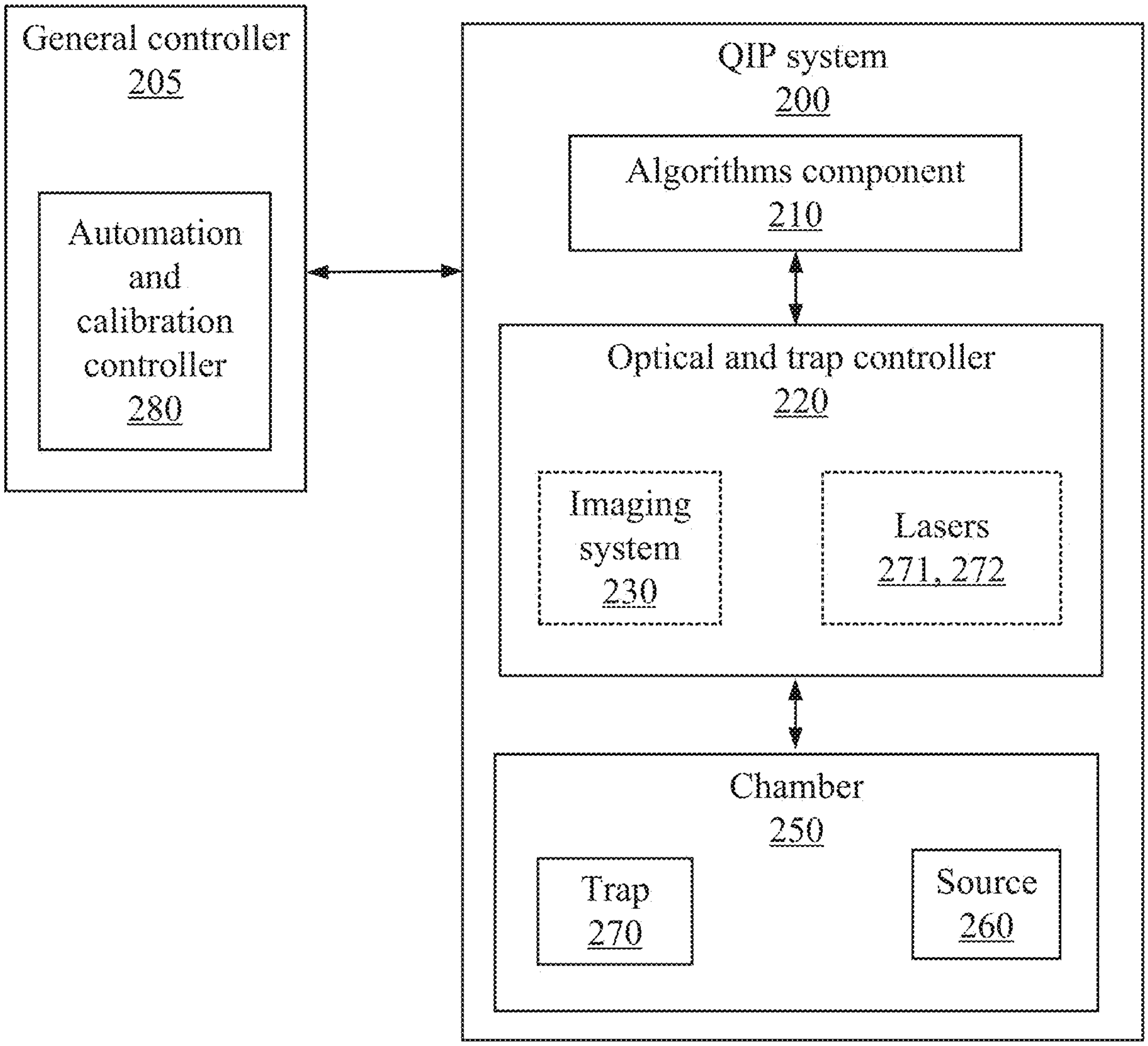
FIG. 2 illustrates an example of a quantum information processing (QIP) system in accordance with aspects of this disclosure.

In particular, FIG. 1 illustrates a diagram 100 with multiple atomic ions 106 (e.g., atomic ions 106*a*, 106*b*, . . . , 106*c*, and 106*d*) trapped in a linear crystal or chain 110 using a trap (e.g., the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes (e.g., segmented electrodes) for trapping or confining multiple atomic ions into the chain 110 that are laser-cooled to be nearly at rest. As will be discussed in more detail below, the electrodes can be configured to shuttle (e.g., in sequence) one or more atomic ions (e.g., qubit ions) or ion chains between multiple spatially different positions in the ion trap. Depending on the spatial position of the qubit ion, a pick-mirror is positioned in an optical path and is tunable to direct light to different image sensors.

In general, it is noted that the number of atomic ions (N) trapped can be configurable and more or fewer atomic ions may be trapped. The atomic ions can be Ytterbium ions (e.g., 171Yb+ ions), for example. In operation, the atomic ions are illuminated with laser (optical) radiation tuned to a resonance in 171Yb+ and the fluorescence of the atomic ions is imaged onto a camera or some other type of detection device. In this example, atomic ions may be separated by about 5 microns (μm) from each other, although the separation may be smaller or larger than 5 μm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used. The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 is a block diagram that illustrates an example of a QIP system 200 in accordance with various aspects of this disclosure. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

As further illustrated, the QIP system 200 of FIG. 2 includes a general controller 205 configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 in a chamber 250, including the generation of signals to control the trap 270 (and the plurality of electrodes in the trap 270), and controls the operation of lasers 271, 272 and optionally other lasers, and further controls the operation of optical systems that provide optical beams that interact with the atoms or ions in the trap. When used to confine or trap ions, the trap 270 may be referred to as an ion trap. The trap 270, however, may also be used to trap neutral atoms, Rydberg atoms, different atomic ions or different species of atomic ions. The lasers 271, 272 and optical systems can be at least partially located in the optical and trap controller 220 and/or in the chamber 250 according to an exemplary aspect. For example, optical systems within the chamber 250 may refer to optical components or optical assemblies.

In an aspect, the code stored in the algorithms components 210 for performing the imaging multiplexing as described herein for trapped ions in the trap 270 can be executed by the general controller 205 and/or the optical and trap controller 220. The code stored in the algorithms components 210 may be configured to control operation of the general controller and/or the optical and trap controller 220.

Moreover, the QIP system 200 may include an imaging system 230. A detailed exemplary aspect of the imaging system 230 will be described below with respect to FIG. 4. The imaging system 230 may include a plurality of sensors, such as a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure. Aspects of this disclosure may be implemented at least partially using the general controller 205, the automation and calibration controller 280, and/or the algorithms component 210. In an exemplary aspect, the automation and calibration controller 280 can be configured to generate control signals that operate and manipulate the motorized components of the imaging system 230 as discussed in more detail below.

Figure 3:
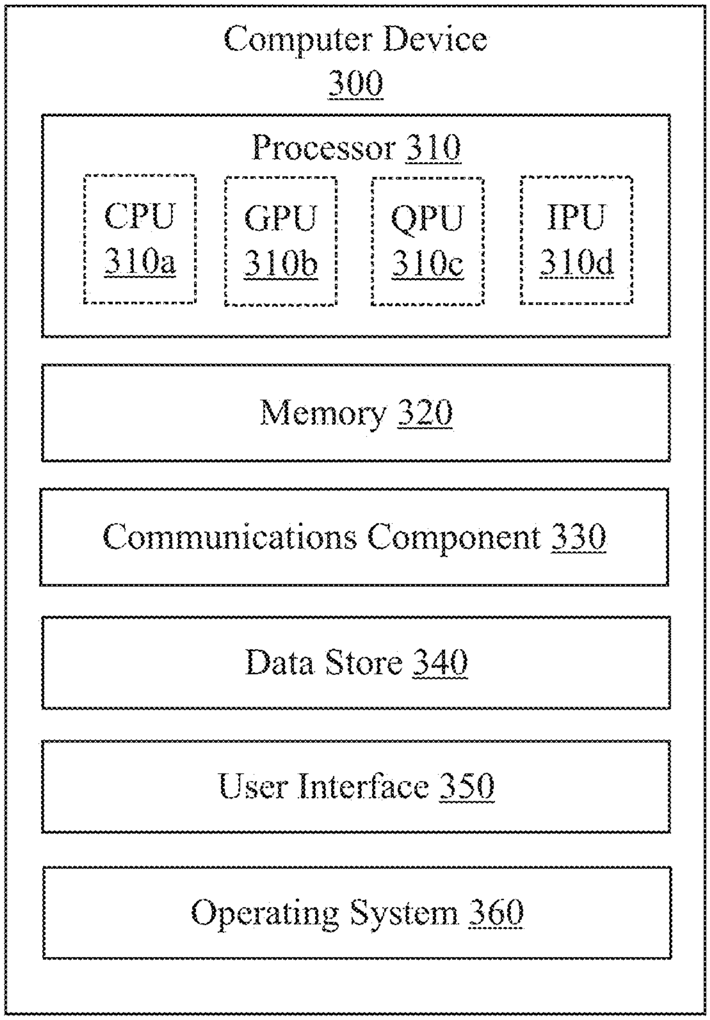
FIG. 3 illustrates an example of a computer device in accordance with aspects of this disclosure.

Referring now to FIG. 3, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parts utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). For example, the user interface component 350 may be configured to receive different user inputs that select the type of imaging process to be performing by the imaging system 230 according to the exemplary aspects described herein. The multiplexing imaging that controls the imaging system 230 will be responsive to the user's selection of the desired process, for example.

Moreover, the user interface component 350 may include one or more input devices, including but not limited to a motorized knob (e.g., to position and/or configure one or more pick-mirrors) keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, described below is a system and method for multiplexing imaging in trapped ion quantum computers and quantum computing systems.

Figure 4:
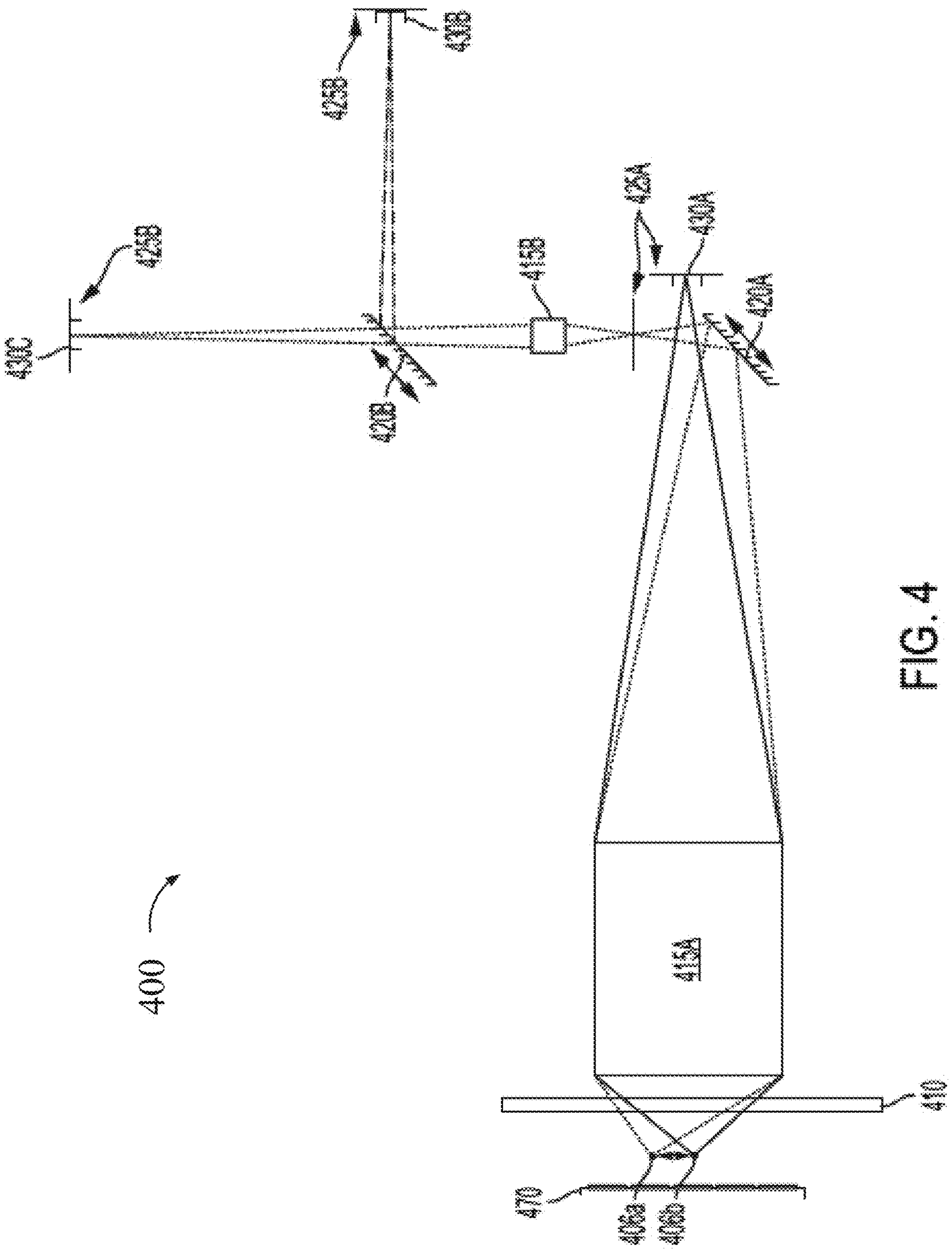
FIG. 4 illustrates a block diagram of an imaging system for multiplexing imaging in trapped ion quantum computers in accordance with aspects of this disclosure.

In general, the exemplary system can be implemented as part of QIP system 200 and is provided for imaging trapped ions in a quantum computer. Specifically, FIG. 4 illustrates an imaging system 400 for multiplexing imaging in trapped ion quantum computers according to an exemplary aspect. It is noted that detailed components of imaging system 400 can be implemented and correspond to the imaging system 230 as generally described above with respect to FIG. 2.

As described above, the exemplary system generally includes an ion trap, which can be implemented as trap 270 described above. Reference 410 illustrates an example of a window or port of a vacuum chamber (e.g., chamber 250) that is provided to readout or image qubit ions as described herein. As described above, the ion trap is configured to trap a plurality of qubit ions, which can be single qubit ions or chains of ions.

The ion trap including a plurality of electrodes 470 that are configured to shuttle individual qubit ions (or parcels or ion chains) between at least a first position **406*b* (e.g., a first regions of the ion trap 270) and a second position 406*a* (e.g., a second regions of the ion trap 270) that is a spatially different position(s) or region(s) in the ion trap. In an exemplary aspect, the plurality of electrodes 470 can be implemented as direct current (DC) electrodes that confine single qubit ions or multiple parcels (groups of one or more ions) in the ion trap 270. The DC electrodes are configured create dynamic electric fields to confine the qubit ions. Moreover, variations of the electric fields by varying the signals applied to the DC electrodes allow for the qubit ions to be shuttled between multiple positions in the ion trap. For example, initially, a confining electric field can be applied to the qubit ion(s) parcels located in between, e.g., opposing DC electrodes. The dynamic electric field created by the DC electrodes can be "tuned" to shuttle the qubit ion(s) between at least two positions (or regions), such as positions 406*a* and 406*b*. Moreover, the plurality of electrodes 470 can be controlled by DC signals provided by optical and trap controller 220**, for example. In an exemplary aspect, some of the DC electrodes may create an attracting field while other ones of the DC electrodes may create a repelling field to move the qubit ion(s) into spatially different positions in the ion trap.

As further shown, system 400 includes a first imaging lens 415A that is configured to collect fluorescence from the qubit ion(s) of the plurality of qubit ions trapped over a surface of the ion trap. A first sensor 430A is disposed in a first optical path (e.g., illustrated as solid lines from lens 415A) that is output from the first imaging lens 415A. Furthermore, a first pick-off mirror 420A is disposed in a second optical path (e.g., illustrated as dotted lines from lens 415A) that output from the first imaging lens 415A. As shown, the second optical path is different than the first optical path, in that they are imaged from the first imaging lens 415A at different angles.

System 400 further includes a second imaging lens 415B that is configured to collect fluorescence that is reflected from the first pick-off mirror 420A. Moreover, a second sensor 430B is disposed in a third optical path (e.g., illustrated as dashed lines from mirror 420B) that is output from the second imaging lens 415B. In operation, the controller (e.g., optical and trap controller 220) is configured to spatially filter the one or more qubit ions by controlling the electrodes 470 in the ion trap to shuttle the qubit ion(s) from the first position **406*b* in which the first imaging lens 415A images the qubit ion(s) in the first optical path to the second position 406*a* in which the first imaging lens 415**A images the qubit ion(s) in the second optical path.

As further shown, the system 400 can include the second pick-off mirror 420B that is disposed in the third optical path (e.g., illustrated as dotted lines from lens 415B and dashed lines output therefrom) between the second imaging lens 415B and the second sensor 430B. In this regard, the second pick-off mirror 420B can be motorized and configured to be adjusted between a first position in which the second pick-off mirror 420B reflects the fluorescence output from the second imaging lens 415B to the second sensor 430B and a second position that allows the fluorescence output from the second imaging lens 415B in at least one additional optical path (e.g., the dotted lines output from the second pick-off mirror 420B).

As further shown, the at least one additional optical path is directed to a third sensor 430C that is disposed in the third optical path and configured to receive the reflected fluorescence that is output from the second imaging lens 415B when the second pick-off mirror 420B is in the second position, i.e., that allows the fluorescence output from the second imaging lens 415B in at least one additional optical path.

As further shown, the system can be considered to include a first imaging plane 425A that includes the first sensor 430A and the second optical path and a second imaging plane 425B that includes the second sensor 430B and the third sensor 430C. In this regard, the controller (e.g., optical and trap controller 220) is configured to multiplex an imaging of the one or more qubit ion(s) between the first imaging plane 425A and the second imaging plane 425B by controlling the electrodes 470 to shuttle the qubit ion(s) from the first position **406*b* to the second position 406*a*, which are spatially different positions in the ion trap (e.g., trap 250**).

As described above, the system is configured to shuttle a single qubit ion between spatially difference positions in the trap. In another exemplary aspect, the plurality of electrodes 470 of the ion trap can also be configured to shuttle an ion chain (e.g., a parcel or group of qubit ions) between the first position **406*b* and the second position 406*a* of spatially different positions in the ion trap. In this regard, the controller (e.g., optical and trap controller 220) is configured to spatially filter the ion chain by controlling the plurality of electrodes 470 to shuttle the ion chain from the first position 406*b* in which the first imaging lens 415A images the ion chain in the first optical path to the second position 406*a* in which the first imaging lens 415**A images the ion chain in the second optical path.

As described herein, the exemplary system is configured for multiplexing imaging in trapped ion quantum computers. This configuration is provided to quickly implement different types of sensors (e.g., image sensors) for different process. For example, for imaging ion positions and loading purposes, a scientific camera sensor can be used, whereas for photon-counting a photo-multiplier-tube would be preferred. Yet further, for ion-photon entanglement generation the system may be best configured by imaging a single qubit onto a single mode fiber core, which then delivers the collected photon to photo-multiplier-tubes for photon detection. Thus, according to an exemplary aspect, each of the first sensor 430A, the second sensors 430B and the third sensor 430C can be one of a single mode fiber, a scientific CMOS camera, and a multimode fiber array configured to transport the imaged fluorescence to a photomultiplier tube. However, it should be appreciated that each of the first sensor 430A, the second sensors 430B and the third sensor 430C will be a different type of image sensor from each other to facilitate the technical advantages of the system and method described herein.

In sum, the imaging system 400 includes the first imaging lens 415A that collects fluorescence from individual qubit ions trapped over the surface of a surface ion-trap. The ion trap has a two dimensional (2D) distribution of electrodes 470 that enable trapping ion chains and shuttling ions between spatially different positions. For illustrative purposes, FIG. 4 illustrates a simplified one-dimensional movement of a single ion between two different positions 406*a* and 406*b*. Moreover, a first sensor 430A is situated at a first image plane 425A where ions are first imaged by the imaging lens 415A. Moreover, the first pick-off mirror 420A is configured to pick off the ion fluorescence selectively when the ion is in position 406*a* shown while allowing the fluorescence to be collected on the first sensor 430A when it is in position 406*b*. Effectively, system 400 is configured to perform a spatial filtering of the one or more qubit ions.

In addition, fluorescence picked off by the pick-off mirror 420A is sent to imaging lens 415B such that it can be then imaged onto imaging plane 425B using imaging lens 415B. In addition, the second pickoff mirror 420B is configured to either image the collected fluorescence onto the second imaging sensor 430B by reflecting all of the fluorescence towards sensor 430B or the second pickoff mirror 420B can be mechanically moved (in response to a control signal) away from the optical path such that all fluorescence is imaged on the third imaging sensor 430C.

In general, fast multiplexing is achieved by changing the ion position on the trap by shuttling such that the first pick-off mirror 420A is used to select the imaging sensor to be between the first sensor 430A and one of the second sensors 430B or the third sensor 430C. Moreover, the first pick-off mirror 420A can be motorized (e.g., controlled by control signals) in order to tune the spatial filtering of imaging of ions such that, at one of the shuttle positions (e.g., position 406*b*), imaging can be performed on the first image sensor 430A, and for the other shuttle position (e.g., position 406*a*), all the of the collected fluorescence is reflected by the mirror to be imaged on imaging plane 425B. Moreover, the second pick-off mirror 420B is configured to enable slow multiplexing, in which the motorized mirror 420B is moved such that imaging can be performed either by using the second sensor 430B or the third sensor 430C as described above.

It should be appreciated that the exemplary configuration described above only captures a two-stage imaging with imaging plane 425A and imaging plane 425B as the imaging planes and therefore the proposed sensor locations. That is, the different stages can be broken up or divided based on whether the system needs to implement fast multiplexing or slow multiplexing as described above. However, it is also noted that the exemplary scheme can be extended beyond just the two-stage imaging shown to additional stages as would be appreciated to one skilled in the art. This can be determined by the principle of operation of a given trapped ion quantum computer, which would have very specific multiplexing scheme that depends on: (i) the types of imaging sensors used in the system, and (ii) the speed of multiplexing for each type of image sensing, i.e., whether it is a fast or slow process.

Figure 5:
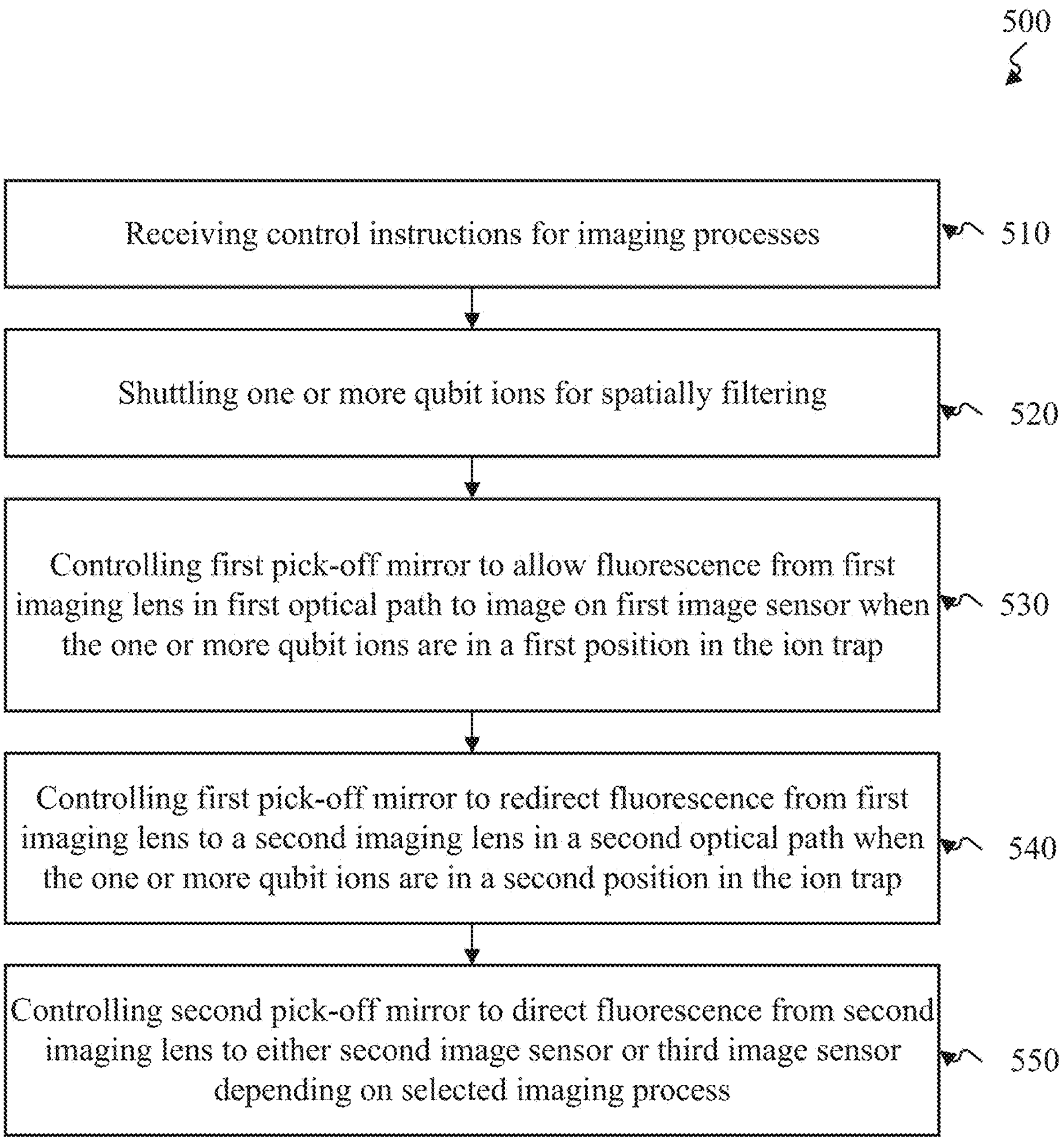
FIG. 5 illustrates a flowchart for a method for multiplexing imaging in trapped ion quantum computers in accordance with aspects of this disclosure.

FIG. 5 illustrates a flowchart for a method for multiplexing imaging in trapped ion quantum computers in accordance with aspects of this disclosure. In general, the exemplary method 500 can be implemented on the systems shown in FIGS. 2-4 and described above. In particular, the exemplary method 500 can be implemented using imaging system 400, for example.

As shown, initially at step 510, the method includes receiving instructions or control (e.g., a user input) that specifies the type of imaging process required to be performed as described above. This process will effectively indicate which of the sensors (e.g., imaging sensors 430A to 430B) should be configured to image the fluorescence of the one or more qubit ions trapped in the ion trap (e.g., trap 250). The selected process will generate control signals to perform the spatial filtering and/or multiplexing (e.g., control of the pick-off mirrors) as described above to direct the fluorescence to the appropriate image sensor.

The method 500 further includes shuttling (at step 520), by the plurality of electrodes 470 in an ion trap, the one or more qubit ions between at least a first position (e.g., position 406*b*) and a second position (e.g., position 406*a*) that is a spatially different position in the ion trap. As described above, DC electrodes are provided with the ion trap and are configured create dynamic electric fields to confine the qubit ions, the controller can then vary electric fields by varying the signals applied to the DC electrodes to shuttle one or more qubit ions between multiple positions or regions in the ion trap, e.g., from a first position to a second position in the ion trap as described herein. Moreover, the first imaging lens then collects fluorescence from the one or more qubit ions trapped over a surface of the ion trap, with the first sensor in a first optical path output from the first imaging lens. At step 530, the method 500 includes controlling a first pick-off mirror 420A disposed in a second optical path output from the first imaging lens that is different than the first optical path. In this regard, the controlling of first pick-off mirror 420A allows fluorescence from first imaging lens in first optical path to image on first image sensor when the one or more qubit ions are in a first position in the ion trap.

A second imaging lens then collects fluorescence that is reflected from the first pick-off mirror 420A based on its controlled configuration. In addition, a second sensor 430B is in a third optical path output from the second imaging lens 415B. According to the exemplary method, the system performs spatially filtering of the one or more one qubit ions by controlling the electrodes in the ion trap to shuttle the qubit ions from the first position (e.g., position 406*b*) in which the first imaging lens images the qubit ions in the first optical path to the second position (e.g., position 406*a*) in which the first imaging lens images the qubit ions in the second optical path.

Finally, at step 550, the method includes controlling a second pick-off mirror 420B in the third optical path between the second imaging lens 415B and the second sensor 430B. In this regard, the method can include adjusting or toggling the second pick-off mirror 420B between a first position in which the second pick-off mirror 420B reflects the fluorescence output from the second imaging lens 415B to the second sensor 430B to a second position that allows the fluorescence output from the second imaging lens 415B in at least one additional optical path. In this regard, a third sensor 430C in the third optical path receives the reflected fluorescence that is output from the second imaging lens 415B when the second pick-off mirror 420B is in the second position.

Advantageously, the exemplary method and system can quickly switch between different imaging sensors without having to reconfigure the entire QIP system and yet perform a robust number of imaging processes as described above. In other words, the multiplexing allows the system to direct the light the is coming out of the one or more qubit ions to two or more different sensors to perform different processes. Moreover, the one or more sensors can be configured to provide feedback (e.g., for system calibration) based on the ion positioning to adjust the ion positions, for example, by changing the field intensities generated by the plurality of electrodes in the ion trap.

In general, it is noted that the previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed:

1. A system of imaging trapped ions in a quantum computer, the system comprising:

an ion trap configured to trap a plurality of qubit ions, the ion trap including a plurality of electrodes configured to shuttle individual qubit ions between at least a first position and a second position of spatially different positions in the ion trap;

a first imaging lens configured to collect fluorescence from at least one qubit ion of the plurality of qubit ions trapped over a surface of the ion trap;

a first sensor disposed in a first optical path output from the first imaging lens;

a first pick-off mirror disposed in a second optical path output from the first imaging lens that is different than the first optical path;

a second imaging lens configured to collect fluorescence that is reflected from the first pick-off mirror;

a second sensor disposed in a third optical path output from the second imaging lens; and a controller configured to spatially filter the at least one qubit ion by controlling the electrodes in the ion trap to shuttle the at least one qubit ion from the first position in which the first imaging lens images the at least one qubit ion in the first optical path to the second position in which the first imaging lens images the at least one qubit ion in the second optical path.

2. The system according to claim 1, further comprising a second pick-off mirror disposed in the third optical path between the second imaging lens and the second sensor.

3. The system according to claim 2, wherein the second pick-off mirror is motorized and configured to be adjusted between a first position in which the second pick-off mirror reflects the fluorescence output from the second imaging lens to the second sensor and a second position that allows the fluorescence output from the second imaging lens in at least one additional optical path.

4. The system according to claim 3, further comprising a third sensor disposed in the third optical path and configured to receive the reflected fluorescence that is output from the second imaging lens when the second pick-off mirror is in the second position.

5. The system according to claim 4, further comprising a first imaging plane that includes the first sensor and the second optical path and a second imaging plane that includes the second and third sensors.

6. The system according to claim 5, wherein the controller is configured to multiplex an imaging of the at least one qubit ion between the first imaging plane and the second imaging plane by controlling the electrodes to shuttle the at least one qubit ion from the first position to the second position spatially different positions in the ion trap.

7. The system according to claim 1, wherein the plurality of electrodes of the ion trap are configured to shuttle an ion chain between the first position and the second position of spatially different positions in the ion trap.

8. The system according to claim 7, wherein the controller is configured to spatially filter the ion chain by controlling the plurality of electrodes to shuttle the ion chain from the first position in which the first imaging lens images the ion chain in the first optical path to the second position in which the first imaging lens images the ion chain in the second optical path.

9. The system according to claim 1, wherein each of the first and second sensors are at least one of a single mode fiber, a scientific CMOS camera, and a multimode fiber array configured to transport the imaged fluorescence to a photomultiplier tube.

10. A method for imaging trapped ions in a quantum computer, the method comprising:

shuttling, by a plurality of electrodes in an ion trap, at least one qubit ion of a plurality of qubit ions between at least a first position and a second position of spatially different positions in the ion trap;

collecting, by a first imaging lens, fluorescence from the at least one qubit ion of the plurality of qubit ions trapped over a surface of the ion trap;

configuring a first sensor in a first optical path output from the first imaging lens;

controlling a first pick-off mirror disposed in a second optical path output from the first imaging lens that is different than the first optical path;

collecting, by a second imaging lens, fluorescence that is reflected from the first pick-off mirror;

configuring a second sensor in a third optical path output from the second imaging lens; and spatially filter the at least one qubit ion by controlling the electrodes in the ion trap to shuttle the at least one qubit ion from the first position in which the first imaging lens images the at least one qubit ion in the first optical path to the second position in which the first imaging lens images the at least one qubit ion in the second optical path.

11. The method according to claim 10, further comprising controlling a second pick-off mirror in the third optical path between the second imaging lens and the second sensor.

12. The method according to claim 11, further comprising adjusting the second pick-off mirror between a first position in which the second pick-off mirror reflects the fluorescence output from the second imaging lens to the second sensor to a second position that allows the fluorescence output from the second imaging lens in at least one additional optical path.

13. The method according to claim 12, further comprising configuring a third sensor in the third optical path to receive the reflected fluorescence that is output from the second imaging lens when the second pick-off mirror is in the second position.

14. The method according to claim 13, wherein a first imaging plane includes the first sensor and the second optical path and a second imaging plane includes the second and third sensors.

15. The method according to claim 14, further comprising multiplexing an imaging of the at least one qubit ion between the first imaging plane and the second imaging plane by controlling the electrodes to shuttle the at least one qubit ion from the first position to the second position spatially different positions in the ion trap.

16. The method according to claim 10, controlling the plurality of electrodes of the ion trap to shuttle an ion chain between the first position and the second position of spatially different positions in the ion trap.

17. The method according to claim 16, further comprising spatially filtering the ion chain by controlling the plurality of electrodes to shuttle the ion chain from the first position in which the first imaging lens images the ion chain in the first optical path to the second position in which the first imaging lens images the ion chain in the second optical path.

18. The method according to claim 10, wherein each of the first and second sensors are at least one of a single mode fiber, a scientific CMOS camera, and a multimode fiber array configured to transport the imaged fluorescence to a photomultiplier tube.

19. A system of imaging trapped ions in a quantum computer, the system comprising:

an ion trap configured to trap a plurality of qubits ions, the ion trap including a plurality of electrodes configured to shuttle individual qubit ions between a first position and a second position that is spatially different than the first position in the ion trap;

a first imaging lens configured to collect fluorescence from a qubit ion of the plurality of qubit ions trapped by the ion trap at the first position;

a first sensor disposed in a first optical path output from the first imaging lens;

a first pick-off mirror disposed in a second optical path output from the first imaging lens that is different than the first optical path;

a second imaging lens configured to collect fluorescence that is reflected from the first pick-off mirror;

a second sensor disposed in a third optical path output from the second imaging lens; and a controller configured to control the electrodes in the ion trap to shuttle the qubit ion from the first position in which the first imaging lens images the qubit ion in the first optical path to the second position in which the first imaging lens images the qubit ion in the second optical path.

20. The system according to claim 19, further comprising:

a second pick-off mirror disposed in the third optical path between the second imaging lens and the second sensor, wherein the second pick-off mirror is motorized and configured to be adjusted between a first position in which the second pick-off mirror reflects the fluorescence output from the second imaging lens to the second sensor and a second position that allows the fluorescence output from the second imaging lens in at least one additional optical path.

* * * * *